United States Patent
Yano et al.

(10) Patent No.: US 6,894,889 B2
(45) Date of Patent: May 17, 2005

(54) ELECTROLYTIC CAPACITOR AND A FABRICATION METHOD THEREFOR

(75) Inventors: Mutsumi Yano, Hirakata (JP); Kazuhiro Takatani, Takatsuki (JP); Mamoru Kimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/677,262

(22) Filed: Oct. 3, 2003

(65) Prior Publication Data

US 2004/0085707 A1 May 6, 2004

(30) Foreign Application Priority Data

Oct. 3, 2002 (JP) ........................................ 2002-290650

(51) Int. Cl.$^7$ ............................ H01G 9/04; H01G 9/145
(52) U.S. Cl. ........................................ 361/528; 361/532
(58) Field of Search ................................. 361/503, 523, 361/524, 528, 529, 530, 532, 533, 534

(56) References Cited

U.S. PATENT DOCUMENTS 3,825,802 A  *  7/1974 Kumagai et al. ........... 361/529
6,674,635 B1 *  1/2004 Fife et al. .................. 361/523

FOREIGN PATENT DOCUMENTS

JP          5-121275         5/1993

* cited by examiner

Primary Examiner—Eric W. Thomas
(74) Attorney, Agent, or Firm—McDermott Will & Emery LLP

(57) ABSTRACT

An electrolytic capacitor of the invention includes an anode of nitrogen-doped titanium or titanium alloy and a dielectric layer formed by anodically oxidizing the anode on a surface of the anode.

6 Claims, 1 Drawing Sheet

ELECTROLYTIC CAPACITOR AND A FABRICATION METHOD THEREFOR

BACKGROUND OF THE INVENTION

1. Field of the Invention

The present invention relates to an electrolytic capacitor and a fabrication method therefor, the electrolytic capacitor in which a dielectric layer is formed by anodically oxidizing an anode on a surface of the anode. More particularly, the invention relates to an electrolytic capacitor characterized in that anodic oxidation is easily carried out in forming a dielectric layer by anodically oxidizing an anode of titanium or titanium alloy on a surface of the anode.

2. Description of the Related Art

Recently, miniaturization of electronic machines has been bringing about a demand for a small-sized capacitor of large capacity. As such a capacitor, an electrolytic capacitor in which a dielectric layer is formed by anodically oxidizing an anode on a surface of the anode is being developed.

A capacitor employing tantalum or niobium as an anode is known as such a capacitor. However, such a capacitor has a problem in its high cost as a result of tantalum or niobium being expensive. Also, there is a limit to get a small-sized capacitor of large capacity because dielectric constant of a dielectric layer which is formed by anodically oxidizing an anode of tantalum or niobium is not always high.

Therefore, more recently, an electrolytic capacitor employing titanium as an anode and forming a dielectric layer of titanium oxide by anodically oxidizing the anode is proposed as disclosed in JP-A-5-121275.

The dielectric layer of titanium oxide which is formed by anodically oxidizing the anode employing titanium has remarkably high dielectric constant in comparison with a dielectric layer formed by anodically oxidizing an anode employing tantalum or niobium. Consequently it is possible to obtain a smaller-sized capacitor of larger capacity.

However, when said anode employing titanium is anodically oxidized, it takes exceedingly long time to form a dielectric layer of titanium oxide. The reason is that a speed of anodic oxidation goes down because titanium oxide is crystallized in anodic oxidation and electrical insulation is reduced.

SUMMARY OF THE INVENTION

It is an object of the invention to provide an electrolytic capacitor comprising an anode of titanium or titanium alloy, and a dielectric layer of high dielectric constant formed by anodically oxidizing the anode on a surface of the anode. In the capacitor, anodic oxidation is easily carried out in short time because reduction of electrical insulation caused by crystallization of the dielectric layer in anodic oxidation is inhibited. As a result, it becomes possible that the capacitor of large capacity is easily provided.

According to the invention, the electrolytic capacitor comprises: a nitrogen-doped anode of titanium or titanium alloy; and a dielectric layer formed by anodically oxidizing the anode on a surface of the anode.

According to the invention, the fabrication method for said electrolytic capacitor is, firstly nitrogen is doped in an anode of titanium or titanium alloy, and then the anode is anodically oxidized to form a dielectric layer on a surface of the anode.

When nitrogen is doped in the anode of titanium or titanium alloy and then the anode is anodically oxidized as above-mentioned, electrical insulation is prevented from reducing because crystallization of the dielectric layer in anodic oxidation is inhibited by the doped nitrogen. As a result, a small-sized capacitor of large capacity is easily provided because the above-mentioned anodic oxidation of the anode is carried out swiftly and the dielectric layer of high dielectric constant is formed in short time.

The kind of said titanium alloy employed as an anode is not limited, but when titanium alloy which is formed by alloying titanium with at least one of additive metal selected from tungsten, vanadium, zinc, aluminum, molybdenum, hafnium, zirconium, and niobium is used, crystallization of the dielectric layer in anodic oxidation is inhibited more effectively, which leads to the result that shorter time is taken to form the dielectric layer.

When the amount of additive metal is too large in said titanium alloy, it is difficult to inhibit crystallization of the dielectric layer sufficiently in anodic oxidation. Hence it is preferred that additive metal content of titanium alloy is 5 wt % or below. Particularly, when the additive metal content is in a range of 0.05 to 2.5 wt %, crystallization of the dielectric layer is inhibited appropriately and the dielectric layer is formed easily in shorter time more than ever.

When the amount of nitrogen is too small or too large in doping nitrogen in the anode of titanium or titanium alloy as above mentioned, it is difficult to inhibit crystallization of the dielectric layer sufficiently in anodic oxidation. Hence it is preferred that nitrogen is doped in a range of 0.01 to 5 wt % to the total amount of titanium or titanium alloy and nitrogen. More preferably, nitrogen is doped in a range of 0.02 to 1 wt % thereto.

Further, when aqueous solution containing fluorine ion is used as the aqueous solution in anodic oxidation, crystallization of the dielectric layer is inhibited more effectively and the dielectric layer is formed easily in shorter time. By the way, in this case fluorine is doped in the dielectric layer. It is preferred that the aqueous solution containing fluorine ion is selected from aqueous solution of ammonium fluoride, potassium fluoride, sodium fluoride, and fluorine acid.

According to the fabrication method for the electrolytic capacitor, nitrogen is doped in the anode of titanium or titanium alloy by heat-treating the anode of titanium or titanium alloy in nitrogen atmosphere.

In the heat-treatment of the anode of titanium or titanium alloy in nitrogen atmosphere, when a temperature of heat-treatment is lower than 300° C., nitrogen is not doped in the anode sufficiently. On the other hand, when the temperature of heat-treatment is higher than 1500° C., nitrogen is doped in the anode superfluously. In both cases, it is difficult to inhibit crystallization of the dielectric layer in anodic oxidation sufficiently. Hence it is preferred that the temperature of heat-treatment is in a range of 300 to 1500° C. in doping nitrogen in the anode of titanium or titanium alloy. More preferably, it is to be in a range of 500 to 900° C.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Figure 1:
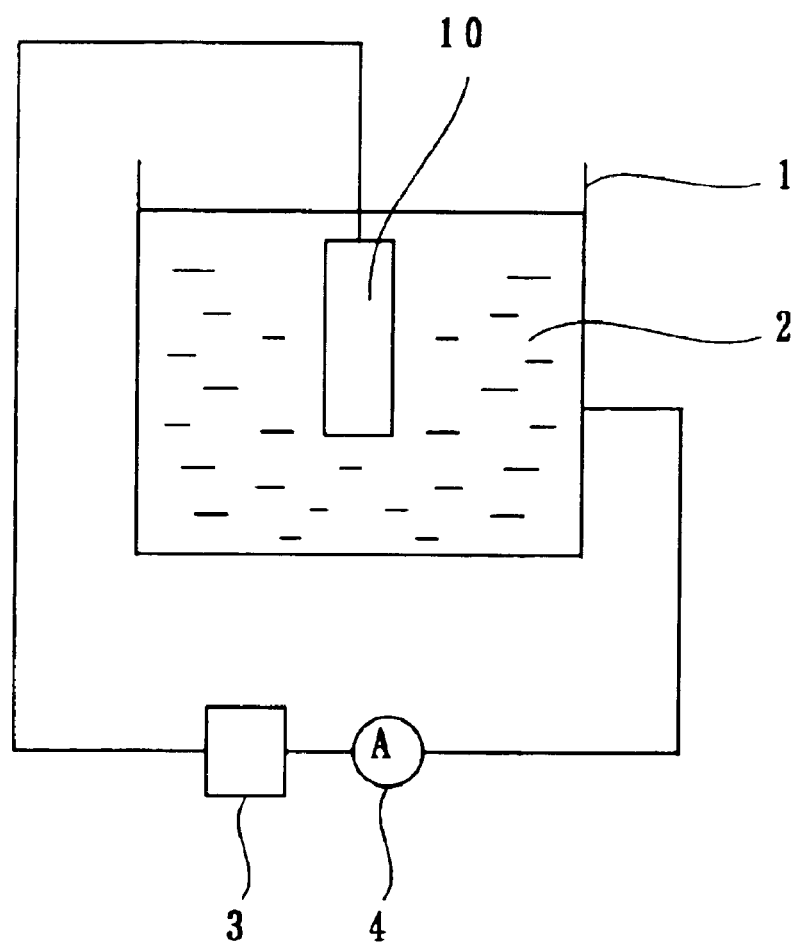
FIG. 1 is a schematic explanatory drawing of electrolytic capacitor which shows a state of an anode being anodically oxidized to form a dielectric layer on a surface of the anode in Examples and Comparative Example.

Hereinafter, electrolytic capacitors according to the preferred embodiments of the invention will specifically be described while comparative example will be cited to demonstrate that in examples of the inventive electrolytic capacitor, the dielectric layers are formed in short time when anodes of titanium or titanium alloy are anodically oxidized to form dielectric layers on surfaces of the anodes, as a result of crystallization of the dielectric layers being inhibited and anodic oxidation being carried out swiftly. It is to be noted that the electrolytic capacitor and the fabrication method of the invention should not be limited to the following examples thereof and suitable changes and modifications may be made thereto within the scope of the invention.

EXAMPLE 1

In Example 1, 100 g of titanium (Ti) powder was pressurized at 1500° C. in a vacuum environment until having a thickness of 100 μm. Then it was cut into a size of 1 cm*5 cm to make an anode of titanium foil.

Next, the anode of titanium foil was heat-treated at 700° C. in nitrogen atmosphere for 5 hours to dope nitrogen in the anode. According to quantitative analysis of the amount of doped nitrogen in the anode based on methods for determination of nitrogen content (JIS G 1228), the amount of doped nitrogen in the anode was 0.1 wt %.

EXAMPLE 2

In Example 2, 1 g of tungsten (W) powder was added to 99 g of titanium powder as additive metal and then a rotary shaking mixer was operated for 20 minutes to mix the powder. The mixed powder was pressurized at 1500° C. in a vacuum environment until having a thickness of 100 μm. Then it was cut into a size of 1 cm*5 cm to make an anode of titanium-tungsten alloy (Ti—W) foil which was alloyed by diffusing tungsten in titanium.

Thereafter the same procedure as in Example 1 was taken to dope nitrogen in the anode. Also in this anode, the amount of the doped nitrogen was 0.1 wt %.

EXAMPLE 3

In Example 3, 1 g of vanadium (V) powder was added to 99 g of titanium powder as additive metal and then a rotary shaking mixer was operated for 20 minutes to mix the powder. The mixed powder was pressurized at 1500° C. in a vacuum environment until having a thickness of 100 μm. Then it was cut into a size of 1 cm* 5 cm to make an anode of titanium-vanadium alloy (Ti—V) foil which was alloyed by diffusing vanadium in titanium.

Thereafter the same procedure as in Example 1 was taken to dope nitrogen in the anode. Also in this anode, the amount of the doped nitrogen was 0.1 wt %.

EXAMPLE 4

In Example 4, 1 g of zinc (Zn) powder was added to 99 g of titanium powder as additive metal and then a rotary shaking mixer was operated for 20 minutes to mix the powder. The mixed powder was pressurized at 1500° C. in a vacuum environment until having a thickness of 100 μm. Then it was cut into a size of 1 cm*5 cm to make an anode of titanium-zinc alloy (Ti—Zn) foil which was alloyed by diffusing zinc in titanium.

Thereafter the same procedure as in Example 1 was taken to dope nitrogen in the anode. Also in this anode, the amount of the doped nitrogen was 0.1 wt %.

EXAMPLE 5

In Example 5, 1 g of aluminum (Al) powder was added to 99 g of titanium powder as additive metal and then a rotary shaking mixer was operated for 20 minutes to mix the powder. The mixed powder was pressurized at 1500° C. in a vacuum environment until having a thickness of 100 μm. Then it was cut into a size of 1 cm*5 cm to make an anode of titanium-aluminum alloy (Ti—Al) foil which was alloyed by diffusing aluminum in titanium.

Thereafter same procedure as in Example 1 was taken to dope nitrogen in the anode. Also in this anode, the amount of the doped nitrogen was 0.1 wt %.

EXAMPLE 6

In Example 6, 1 g of molybdenum (Mo) powder was added to 99 g of titanium powder as additive metal and then a rotary shaking mixer was operated for 20 minutes to mix the powder. The mixed powder was pressurized at 1500° C. in a vacuum environment until having a thickness of 100 μm. Then it was cut into a size of 1 cm*5 cm to make an anode of titanium-molybdenum alloy (Ti—Mo) foil which was alloyed by diffusing molybdenum in titanium.

Thereafter the same procedure as in Example 1 was taken to dope nitrogen in the anode. Also in this anode, the amount of the doped nitrogen was 0.1 wt %.

EXAMPLE 7

In Example 7, 1 g of hafnium (Hf) powder was added to 99 g of titanium powder as additive metal and then a rotary shaking mixer was operated for 20 minutes to mix the powder. The mixed powder was pressurized at 1500° C. in a vacuum environment until having a thickness of 100 μm. Then it was cut into a size of 1 cm*5 cm to make an anode of titanium-hafnium alloy (Ti—Hf) foil which was alloyed by diffusing hafnium in titanium.

Thereafter the same procedure as in Example 1 was taken to dope nitrogen in the anode. Also in this anode, the amount of the doped nitrogen was 0.1 wt %.

EXAMPLE 8

In Example 8, 1 g of zirconium (Zr) powder was added to 99 g of titanium powder as additive metal and then a rotary shaking mixer was operated for 20 minutes to mix the powder. The mixed powder was pressurized at 1500° C. in a vacuum environment until having a thickness of 100 μm. Then it was cut into a size of 1 cm*5 cm to make an anode of titanium-zirconium alloy (Ti—Zr) foil which was alloyed by diffusing zirconium in titanium.

Thereafter the same procedure as in Example 1 was taken to dope nitrogen in the anode. Also in this anode, the amount of the doped nitrogen was 0.1 wt %.

EXAMPLE 9

In Example 9, 1 g of niobium (Nb) powder was added to 99 g of titanium powder as additive metal and then a rotary shaking mixer was operated for 20 minutes to mix the powder. The mixed powder was pressurized at 1500° C. in a vacuum environment until having a thickness of 100 μm. Then it was cut into a size of 1 cm*5 cm to make an anode of titanium-niobium alloy (Ti—Nb) foil which was alloyed by diffusing niobium in titanium.

Thereafter the same procedure as in Example 1 was taken to dope nitrogen in the anode. Also in this anode, the amount of the doped nitrogen was 0.1 wt %.

EXAMPLE 10

In Example 10, 0.5 g of zinc powder and 0.5 g of aluminum powder were added to 99 g of titanium powder as additive metal and then a rotary shaking mixer was operated for 20 minutes to mix the powder. The mixed powder was pressurized at 1500° C. in a vacuum environment until having a thickness of 100 $\mu$m. Then it was cut into a size of 1 cm*5 cm to make an anode of titanium-zinc-aluminum alloy (Ti—Zn—Al) foil which was alloyed by diffusing zinc and aluminum in titanium.

Thereafter the same procedure as in Example 1 was taken to dope nitrogen in the anode. Also in this anode, the amount of the doped nitrogen was 0.1 wt %.

COMPARATIVE EXAMPLE 1

In Comparative Example 1, the same procedure as in Example 1 was taken to fabricate an anode of titanium foil of Comparative Example 1 except that nitrogen was not doped in the anode of Comparative Example 1.

Next, in anodic oxidation of each anode of Examples 1 to 10 and Comparative Example 1 to form a dielectric layer, length of time for anodic oxidation was determined to make a comparison with each anode.

In anodic oxidation of each anode, as shown in FIG. 1, the anode 10 was immersed in aqueous solution 2 containing 0.6% by volume of phosphoric acid which was kept at 60° C. and was accommodated in the stainless steel vessel 1. Then uniform voltage of 25 V from power supply 3 was impressed to anodically oxidize anode 10.

As each anode 10 was anodically oxidized, leakage current was measured by ammeter 4. The length of time for the leakage current of each anode 10 reaching 500 $\mu$A in anodic oxidation was determined.

An index number of length of time for anodic oxidation of each anode was determined on a basis of the length of time for the leakage current of Example-1 anode reaching 500 $\mu$A in anodic oxidation defined as 100. The results are listed in Table 1 as below. By way of parenthesis, the length of time for the leakage current of Example-1 anode reaching 500 $\mu$A in anodic oxidation was approximately 2 minutes.

TABLE 1

| | ANODE MATERIAL AND WEIGHT RATIO | TEMPERATURE OF NITROGEN-DOPING (° C.) | LENGTH OF TIME FOR ANODIC OXIDATION |
|---|---|---|---|
| EXAMPLE 1 | Ti | 700 | 100 |
| EXAMPLE 2 | Ti-W (99:1) | 700 | 99 |
| EXAMPLE 3 | Ti-V (99:1) | 700 | 84 |
| EXAMPLE 4 | Ti-Zn (99:1) | 700 | 98 |
| EXAMPLE 5 | Ti-Al (99:1) | 700 | 85 |
| EXAMPLE 6 | Ti-Mo (99:1) | 700 | 97 |
| EXAMPLE 7 | Ti-Hf (99:1) | 700 | 90 |
| EXAMPLE 8 | Ti-Zr (99:1) | 700 | 95 |
| EXAMPLE 9 | Ti-Nb (99:1) | 700 | 89 |
| EXAMPLE 10 | Ti-Zn-Al (99:0.5:0.5) | 700 | 96 |
| COMPARATIVE EXAMPLE 1 | Ti | — | 5000 |

As apparent from the table, each anode of Examples 1 to 10 employing titanium or titanium alloy in which nitrogen was doped took notably short time for anodic oxidation in comparison with the anode of Comparative Example 1 in which nitrogen was not doped.

In accordance to a comparison among the anodes of Examples 1 to 10, the anodes of Examples 2 to 10 employing titanium alloy formed by alloying titanium with one of the additive metal selected from tungsten, vanadium, zinc, aluminum, molybdenum, hafnium, zirconium, and niobium took shorter time for anodic oxidation than the anode of Example 1 employing titanium. Particularly, the anodes of Examples 3, 5, 7, and 9 employing titanium alloy formed by alloying titanium with additive metal selected from vanadium aluminum, hafnium, and niobium took shorter time for anodic oxidation more than ever.

EXAMPLE 5.1~5.6

In Examples 5.1 to 5.6, aluminum powder as in Example 5 was added to titanium powder as additive metal.

The same procedure as in Example 5 was taken to fabricate each anode of Examples 5.1 to 5.6, except that a titanium-to-aluminum weight ratio was changed in mixing titanium powder and aluminum powder.

The titanium-to-aluminum weight ratios in mixing titanium powder and aluminum powder were respectively set 99.95:0.05 in Example 5.1; 99.9:0.1 in Example 5.2; 99.5:0.5 in Example 5.3; 97.5:2.5 in Example 5.4; 95:5 in Example 5.5; and 92.5:7.5 in Example 5.6. The aluminum (Al) content of each anode is listed in Table 2 as below.

Then the same procedure as in Example 5 was taken to anodically oxidize each anode of Examples 5.1 to 5.6. The length of time for the leakage current of each anode of Examples 5.1 to 5.6 reaching 500 $\mu$A in anodic oxidation was determined. An index number of length of time for anodic oxidation of each anode was determined on a basis of the length of time for the leakage current of Example-5 anode reaching 500 $\mu$A in anodic oxidation defined as 100. The results are listed in Table 2 as below. Further, the amount of the doped nitrogen in each anode of Examples 5.1 to 5.6, was also 0.1 wt %.

TABLE 2

| | ANODE MATERIAL | Al CONTENT (WT %) | TEMPERATURE OF NITROGEN-DOPING (° C.) | LENGTH OF TIME FOR ANODIC OXIDATION |
|---|---|---|---|---|
| EXAMPLE 5.1 | Ti-Al | 0.05 | 700 | 115 |
| EXAMPLE 5.2 | Ti-Al | 0.1 | 700 | 102 |
| EXAMPLE 5.3 | Ti-Al | 0.5 | 700 | 101 |
| EXAMPLE 5 | Ti-Al | 1.0 | 700 | 100 |
| EXAMPLE 5.4 | Ti-Al | 2.5 | 700 | 101 |
| EXAMPLE 5.5 | Ti-Al | 5.0 | 700 | 110 |
| EXAMPLE 5.6 | Ti-Al | 7.5 | 700 | 500 |

As apparent from the table, the anodes of Example 5 and Examples 5.1 to 5.5 in which aluminum content of each anode of titanium-aluminum alloy is 5 wt % or below, took notably short time for anodic oxidation in comparison with the anode of Example 5.6 in which aluminum content of the anode is 7.5 wt %, surpassing 5 wt %. Particularly, each anode of Example 5 and Examples 5.1 to 5.3 in which aluminum content was in a range of 0.1 to 2.5 wt % took shorter time for anodic oxidation more than ever.

In a mode, above-mentioned Examples showed only a case of the anodes employing titanium-aluminum alloy formed by alloying titanium with aluminum, but similar effects may be obtained when titanium alloy is formed by alloying titanium with additive metal selected from tungsten, vanadium, zinc, molybdenum, zirconium, and niobium, in place of aluminum.

EXAMPLE 1.1~1.9

The titanium foil as in Example 1 was employed as anodes of Examples 1.1 to 1.9. Also the same procedure as in Example 1 was taken to fabricate each anode except that the temperature of heat-treatment of the anode in nitrogen atmosphere to dope nitrogen in each anode was changed so that to the amount of doped nitrogen in each anode be changed.

The temperatures of heat-treatment of anodes of titanium in nitrogen atmosphere were respectively set 200° C. in Example 1.1; 300° C. in Example 1.2; 500° C. in Example 1.3; 900° C. in Example 1.4; 950° C. in Example 1.5; 1000° C. in Example 1.6; 1250° C. in Example 1.7; 1500° C. in Example 1.8; and 1600° C. in Example 1.9 as listed in Table 3 as below.

According to quantitative analysis of the amount of doped nitrogen in the anode based on methods for determination of nitrogen content (JIS G 1228) as in Example 1, the amount of doped nitrogen in each anode was as follows; 0.005 wt % in the anode of Example 1.1; 0.01 wt % in the anode of Example 1.2; 0.02 wt % in the anode of Example 1.3; 1 wt % in the anode of Example 1.4; 1.5 wt % in the anode of Example 1.5; 3 wt % in the anode of Example 1.6; 4 wt % in the anode of Example 1.7; 5 wt % in the anode of Example 1.8; and 6 wt % in the anode of Example 1.9 as listed in Table 3 as below.

The same procedure as in Example 1 was taken to anodically oxidize each anode of Examples 1.1 to 1.9. The length of time for leakage current of each anode of Examples 1.1 to 1.9 reaching 500 μA in anodic oxidation was determined. An index number of length of time for anodic oxidation of each anode was determined on a basis of the length of time for the leakage current of Example-1 anode reaching 500 μA in anodic oxidation defined as 100. The results are listed in Table 3 as below.

EXAMPLE 1.10~1.13

1 wt % of nitrogen was doped in the anodes of Examples 1.10 to 1.13 by heat-treating the anodes of titanium foil in nitrogen atmosphere as in Example 1.

The same procedure as in Example 1 was taken to anodically oxidize each anode of Examples 1.10 to 1.13 except the kind of aqueous solution. The kind of aqueous solution used in anodic oxidation of each anode in place of aqueous solution containing 0.6% by volume of phosphoric acid which was kept at 60° C. in Example 1 was changed as follows; aqueous solution containing 0.5% by volume of ammonium fluoride kept at 60° C. in Example 1.10; aqueous solution containing 0.5% by volume of potassium fluoride kept at 60° C. in Example 1.11; aqueous solution containing 0.5% by volume of sodium fluoride kept at 60° C. in Example 1.12; and aqueous solution containing 0.5% by volume of fluoric acid kept at 60° C. in Example 1.13.

Leakage current was measured by ammeter 4 as each anode 10 was anodically oxidized. The length of time for the leakage current of each anode reaching 500 μA in anodic oxidation was determined.

An index number of length of time for anodic oxidation of each anode was determined on a basis of the length of time for the leakage current of Example-1 anode reaching 500 μA in anodic oxidation defined as 100. The results are listed in Table 4 as below.

In a mode, as a result of analysis by Electron Spectroscopy for Chemical Analysis (ESCA), in each dielectric layer which was formed by anodic oxidation as above mentioned, it was confirmed that fluorine was doped in each dielectric layer of Examples 1.10 to 1.13.

TABLE 3

| | ANODE MATERIAL | TEMPERATURE OF NITROGEN-DOPING (° C.) | NITROGEN CONTENT (WT %) | LENGTH OF TIME FOR ANODIC OXIDATION |
|---|---|---|---|---|
| EXAMPLE 1.1 | Ti | 200 | 0.005 | 4000 |
| EXAMPLE 1.2 | Ti | 300 | 0.01 | 200 |
| EXAMPLE 1.3 | Ti | 500 | 0.02 | 120 |
| EXAMPLE 1 | Ti | 700 | 0.1 | 100 |
| EXAMPLE 1.4 | Ti | 900 | 1 | 120 |
| EXAMPLE 1.5 | Ti | 950 | 1.5 | 200 |
| EXAMPLE 1.6 | Ti | 1000 | 3 | 220 |
| EXAMPLE 1.7 | Ti | 1250 | 4 | 235 |
| EXAMPLE 1.8 | Ti | 1500 | 5 | 250 |
| EXAMPLE 1.9 | Ti | 1600 | 6 | 3000 |

As apparent from the table, the anodes of Example 1 and Examples 1.2 to 1.8 took notably short time for anodic oxidation in comparison with the anodes of Example 1.1 and Example 1.9, the anodes of Example 1 and Examples 1.2 to 1.8 wherein the temperatures of heat-treating the anodes of titanium foil was in a range of 300° C. to 1500° C. and doped nitrogen content of each anode was in a range of 0.01 to 5 wt %; the anode of Example 1.1 wherein the temperature of heat-treating the anode was 200° C., lower than 300° C., and the doped nitrogen content of the anode was 0.005 wt %, less than 0.1 wt %; and the anode of Example 1.9 wherein the temperature of heat-treating the anode was 1600° C., higher than 1500° C., and the doped nitrogen content of the anode was 6 wt %, surpassing 5 wt %. Particularly, the anodes of Example 1 and Examples 1.3 and 1.4, wherein the temperatures of heat-treatment were in the range of 500° C. to 900° C. took shorter time for anodic oxidation more than ever.

TABLE 4

| | ANODE MATERIAL | AQUEOUS SOLUTION IN ANODIC OXIDATION | FLUORINE DOPED/NOT DOPED | LENGTH OF TIME FOR ANODIC OXIDATION |
|---|---|---|---|---|
| EXAMPLE 1.10 | Ti | AMMONIUM FLUORIDE | DOPED | 90 |
| EXAMPLE 1.11 | Ti | POTASSIUM FLUORIDE | DOPED | 95 |
| EXAMPLE 1.12 | Ti | SODIUM FLUORIDE | DOPED | 95 |
| EXAMPLE 1.13 | Ti | FLUORINE ACID | DOPED | 97 |
| EXAMPLE 1 | Ti | PHOSPHRIC ACID | NOT DOPED | 100 |

As apparent from the table, Examples 1.10 to 1.13 wherein fluorine ion was doped in dielectric layers by using aqueous solution containing fluorine ion in anodic oxidation took shorter time for anodic oxidation in comparison with Example 1.

In a mode, above mentioned each Example showed only a case of an anode employing titanium foil, but similar effects may be obtained in a case of an anode employing titanium alloy which is formed by alloying titanium with additive metal selected from tungsten, vanadium, zinc, aluminum, molybdenum, hafnium, zirconium, and niobium.

Although the present invention has been fully described by way of examples, it is to be noted that various changes and modifications will be apparent to those skilled in the art.

Therefore, unless otherwise such changes and modifications depart from the scope of the invention, they should be construed as being included therein.

What is claimed is:

1. An electrolytic capacitor comprising: an anode of nitrogen-doped titanium or nitrogen-doped titanium alloy; and a dielectric layer formed by anodically oxidizing the anode on a surface of the anode, wherein nitrogen is doped in the titanium or the titanium alloy in a range of 0.01 to 5 wt %.

2. The electrolytic capacitor as claimed in claim 1, wherein said titanium alloy is formed by alloying titanium with at least one of additive metal selected from tungsten, vanadium, zinc, aluminum, molybdenum, hafnium, zirconium, and niobium.

3. The electrolytic capacitor as claimed in claim 2, wherein at least one additive metal content of the titanium alloy is 5 wt % or below.

4. The electrolytic capacitor as claimed in claim 3, wherein the at least one additive metal content of the titanium alloy is in a range of 0.05 to 2.5 wt %.

5. The electrolytic capacitor as claimed in claim 1, wherein nitrogen is doped in the titanium or the titanium alloy in a range of 0.02 to 1 wt %.

6. The electrolytic capacitor as claimed in claim 1, wherein fluorine is doped in said dielectric layer.

* * * * *